United States Patent
Mammoli et al.

(10) Patent No.: US 10,158,234 B2
(45) Date of Patent: Dec. 18, 2018

(54) SYSTEMS AND METHODS FOR INTEGRATING DISTRIBUTED ENERGY RESOURCES

(71) Applicants: STC. UNM, Albuquerque, NM (US); Andrea A. Mammoli, Corrales, NM (US); Yasser Yasaei, Albuquerque, NM (US)

(72) Inventors: Andrea A. Mammoli, Corrales, NM (US); Yasser Yasaei, Albuquerque, NM (US)

(73) Assignee: STC.UNM, Albuquerque, NM (US)

(*) Notice: Subject to any disclaimer, the term of this patent is extended or adjusted under 35 U.S.C. 154(b) by 126 days.

(21) Appl. No.: 15/112,252

(22) PCT Filed: Jan. 16, 2015

(86) PCT No.: PCT/US2015/011788
§ 371 (c)(1),
(2) Date: Jul. 18, 2016

(87) PCT Pub. No.: WO2015/109207
PCT Pub. Date: Jul. 23, 2015

(65) Prior Publication Data
US 2016/0336752 A1    Nov. 17, 2016

Related U.S. Application Data

(60) Provisional application No. 61/928,941, filed on Jan. 17, 2014.

(51) Int. Cl.
*H02J 3/38*    (2006.01)
*H02J 7/00*    (2006.01)

(52) U.S. Cl.
CPC .............. *H02J 3/382* (2013.01); *H02J 3/381* (2013.01); *H02J 3/383* (2013.01); *H02J 3/386* (2013.01); *H02J 3/387* (2013.01); *H02J 7/0068* (2013.01)

(58) Field of Classification Search
CPC .... G06F 1/26; G06F 1/30; H02J 3/382; H02J 3/383; H02J 3/386; H02J 3/387; H02J 7/0068; H02J 3/381
See application file for complete search history.

(56) References Cited

U.S. PATENT DOCUMENTS

2004/0095273 A1   5/2004   Chen
2012/0316688 A1*  12/2012  Boardman .......... H02J 13/0079
                                                   700/291
(Continued)

FOREIGN PATENT DOCUMENTS

KR    10-1259728 B1    5/2013
WO    2011058383 A2    5/2011

OTHER PUBLICATIONS

International Search Report and Written Opinion of the International Search Authority for PCT/US2015/011788, dated Apr. 29, 2015 (10 pages).

*Primary Examiner* — Robert Deberadinis
(74) *Attorney, Agent, or Firm* — Nathaniel A. Gilder

(57) ABSTRACT

The present invention is an apparatus and method for using aggregated loads from a plurality of distributed energy resources to perform a function at a power distribution feeder. The invention includes a plurality of distributed energy resources, wherein at least one distributed energy resource includes a renewable energy resource, a communication network, a control device, a power distribution feeder coupled to the control device, and an energy storage system coupled to the power distribution feeder. The control device sends a signal to the plurality of distributed energy (Continued)

resources via the communication network. The signal is a request to switch a status of one or more of the distributed energy resources if one or more distributed energy resources is within a predetermined condition. Loads from the one or more of the distributed energy resources that switched status are aggregated to perform a function at the power distribution feeder.

17 Claims, 11 Drawing Sheets

(56) References Cited

U.S. PATENT DOCUMENTS

2013/0134780 A1    5/2013   Parsonnet
2013/0166084 A1    6/2013   Sedighy

* cited by examiner

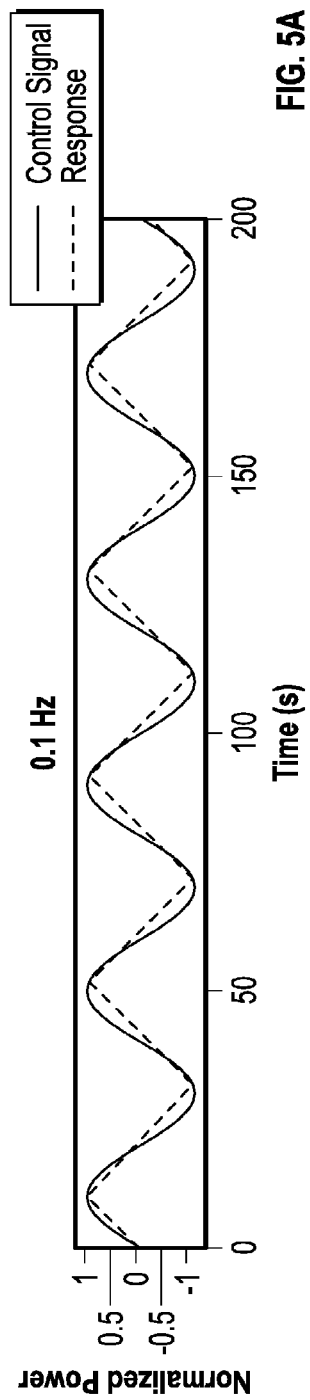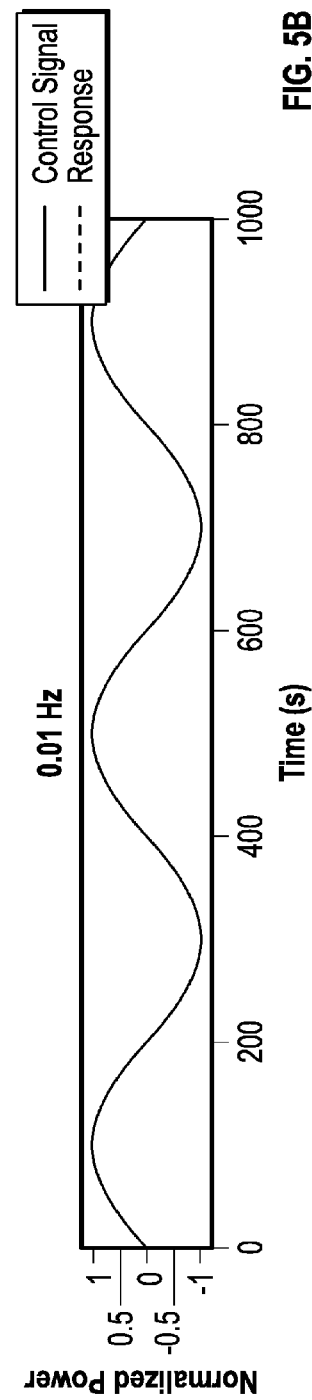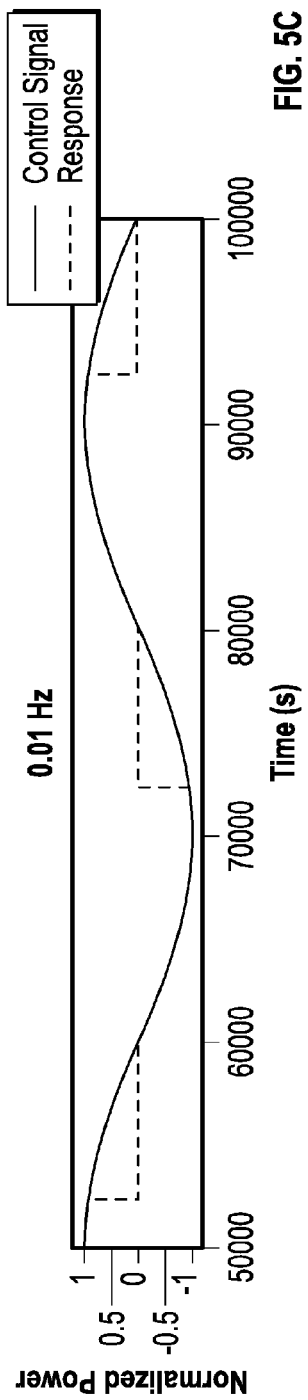
FIG. 5A
FIG. 5B
FIG. 5C

SYSTEMS AND METHODS FOR INTEGRATING DISTRIBUTED ENERGY RESOURCES

STATEMENT REGARDING FEDERALLY SPONSORED RESEARCH OR DEVELOPMENT

This invention was made with government support under contract number HDTRA1-13-1-0020 awarded by the Defense Threat Reduction Agency. The government has certain rights in the invention.

CROSS-REFERENCE TO RELATED APPLICATIONS

This application is a U.S. National Stage Application filing under 35 U.S.C. § 371 of International Application PCT/US2015/011788, entitled "SYSTEMS AND METHODS FOR INTEGRATING DISTRIBUTED ENERGY RESOURCES", filed on Jan. 16, 2015, which claims priority under 35 U.S.C. § 119 of U.S. Provisional Patent Application 61/928,941, filed on Jan. 17, 2014. The disclosures of the prior applications are incorporated by reference herein in their entirety.

BACKGROUND

Field of the Invention

Embodiments of the present invention include a system and method for integrating distributed energy resources (DERs) on a power grid distribution feeder. Specifically, one embodiment of the present invention includes a system and method to control a plurality of thermostatically controlled loads (TCLs) that collectively perform a useful function in connection with a power grid distribution feeder.

Description of the Related Art

Renewable resources are becoming more and more available and affordable due to the development of technology and the enactment of government policies. Renewables and specifically photovoltaics (PV) are playing an ever increasing role in the resource mix for utilities across the nation. Many of these resources pose new integration challenges compared to traditional power generation. Electric utilities are required to deliver reliable power to customers and must operate utility grids within strict limits, including power and voltage limits. As renewable energy becomes a larger player amongst the resources supplying energy to these utility grids, issues begin arising due to the intermittent nature of the renewable resources.

The increasing penetration rate of renewable resources into utility grids is prompting the development of new methods and approaches for improving power generation as well as managing demand (to the extent possible) in distribution feeders. The balance between the load and the generation will soon no longer be met with only dispatchable power generation, but will also be met with loads in a controllable fashion as well.

TCLs have been addressed as amongst the greatest potential for demand-side participation in the future electricity market. Based on the energy capacity of TCLs, end-users can participate in the load management in a non-disruptive fashion. This is also true in cases of vast power curtailment necessity for maintaining power grid stability.

Cooling loads in the US, moreover, represent more than 13% of the total energy consumption in commercial buildings during normal conditions, and can exceed this average during hot summer days. More specifically, this consumption can reach about 20% during peak demand periods, which consequently affects distribution and transmission infrastructures. Heating, ventilating and air-conditioning (HVAC) systems are the largest single contributor to the peak demand, and as an important instance of TCLs, play a significant role in the future of demand-side participation in the energy market. There is thus a need to develop a method of using TCLs in a load management problem.

SUMMARY

One embodiment of the present invention is an apparatus for using aggregated loads from a plurality of distributed energy resources to perform a function at a power distribution feeder. This embodiment includes the plurality of distributed energy resources, wherein at least one of the distributed energy resource includes a renewable energy resource. This embodiment also includes a communication network, a control device, a power distribution feeder coupled to the control device, and an energy storage system coupled to the power distribution feeder. The control device sends a signal to the plurality of distributed energy resources via the communication network. The signal is a request to switch a status of one or more of the distributed energy resources if one or more distributed energy resources is within a predetermined condition. Loads from one or more of the distributed energy resources that switched status are aggregated to perform a function at the power distribution feeder. The distributed energy resources include a plurality of thermostatically controlled loads. The thermostatically controlled loads may be thermal storage units. The thermostatically controlled loads can include smart thermostats. In an alternative embodiment, the energy storage system stores a portion of the aggregated load. The function can be to control the demand on the power distribution feeder or to contrast intermittent renewal energy generation. Advanced meter infrastructure is not required for the apparatus. The signal is sent to the plurality of distributed energy resources about once per second. The predetermined condition is a temperature range.

Another embodiment of the present invention is a method of using aggregated loads from a plurality of distributed energy resources to perform a function at a power distribution feeder. This method includes sending a signal to the plurality of distributed energy resources over a communication network, the signal including a request to switch a status of one or more of the distributed energy resources if the one or more distributed energy resources is within a predetermined condition, switching the status of one or more of the distributed energy resources if the one or more distributed energy resources is within the predetermined condition, aggregating the load of the one or more distributed energy resources that switched status, and using at least a portion of the aggregated load to perform a function at the power distribution feeder. The function can include reducing peak load at the power distribution feeder, controlling a ramp rate of power at the power distribution feeder. The method can further include shifting distribution feeder loads to off-peak periods and/or adjusting power levels at the power distribution feeder to contrast intermittent renewable energy generators. The one or more distributed energy resources can be one or more thermostatically controlled loads. The thermostatically controlled loads may be thermal storage units and/or smart thermostats. A portion of the aggregated load can be stored in an energy storage system. The predetermined condition can be a temperature range.

DETAILED DESCRIPTION OF THE DRAWINGS

FIGS. 5A-5C are a series of graphs showing maximum ramp-rate and storage capacity of a battery. FIG. 5A shows a ramp-rate limit of a battery as it cannot track a high frequency signal. FIG. 5B shows the frequency of a sinusoidal signal that does not exceed the maximum ramp-rate and the capacity of the battery is enough for the amount of energy within the sinusoidal signal to be stored in it. FIG. 5C shows a lower frequency signal in which the capacity of the battery is less than the energy stored in the sinusoidal signal.

Figure 6:
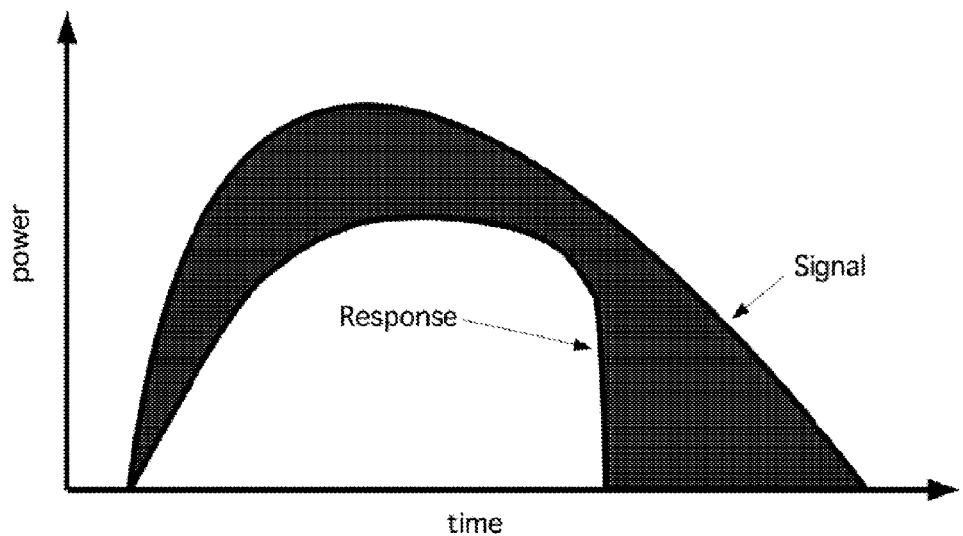

FIG. 6 is a graph showing criteria used for tracking.

Figure 7:
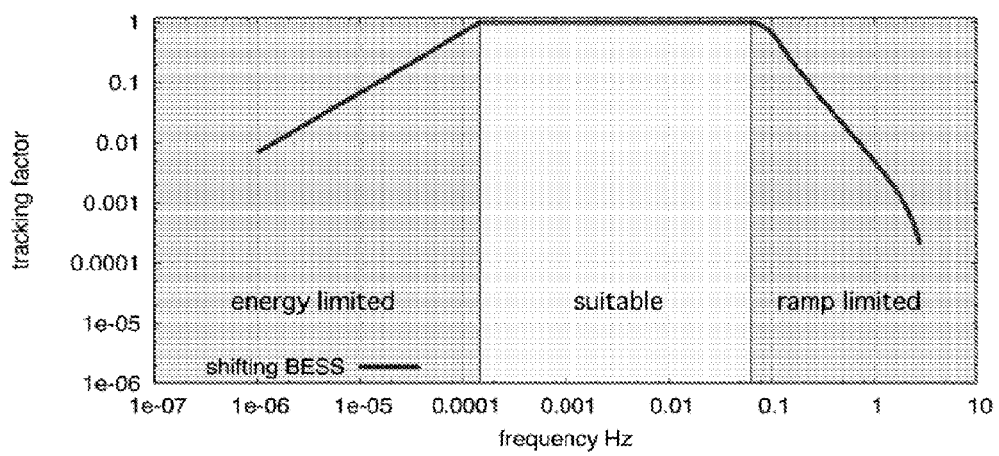

FIG. 7 is a graph showing a battery energy storage system as a band pass filter.

Figure 8A:
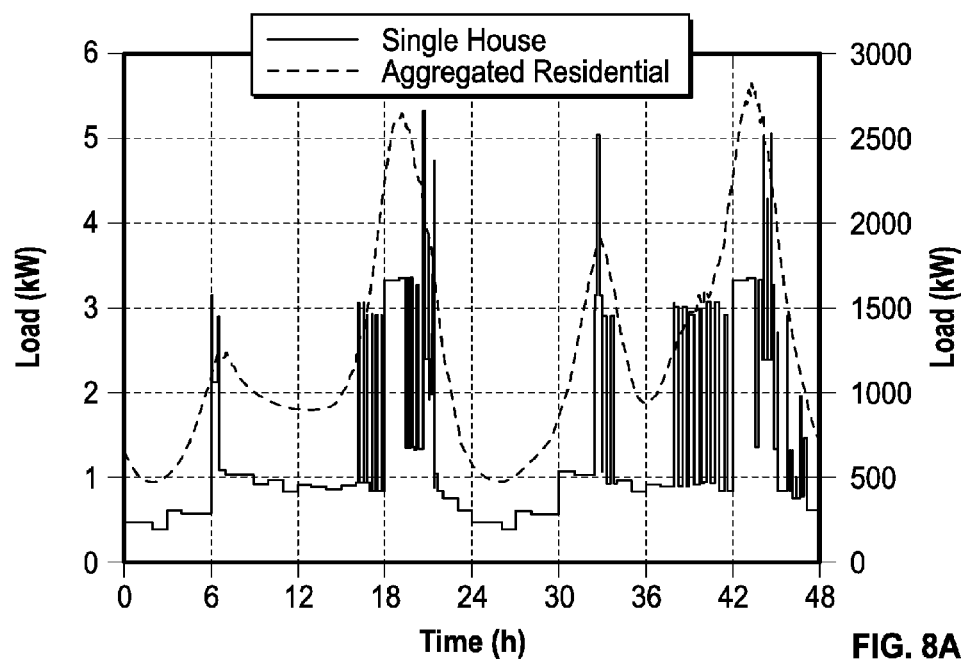
Figure 8B:
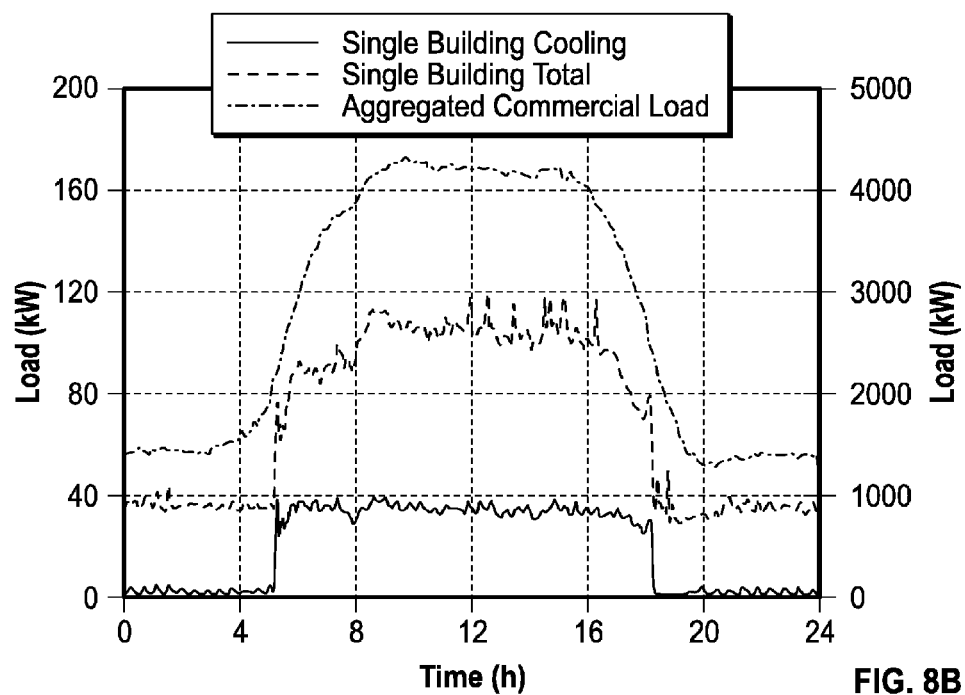

FIGS. 8A and 8B are graphs showing the contribution of cooling load on power consumption for residential and commercial buildings in both single and aggregated forms. FIG. 8A is for a 48 hour duration in residential buildings. FIG. 8B is for a 24 hour duration and the contribution of such a load in the total demand.

Figure 9A:
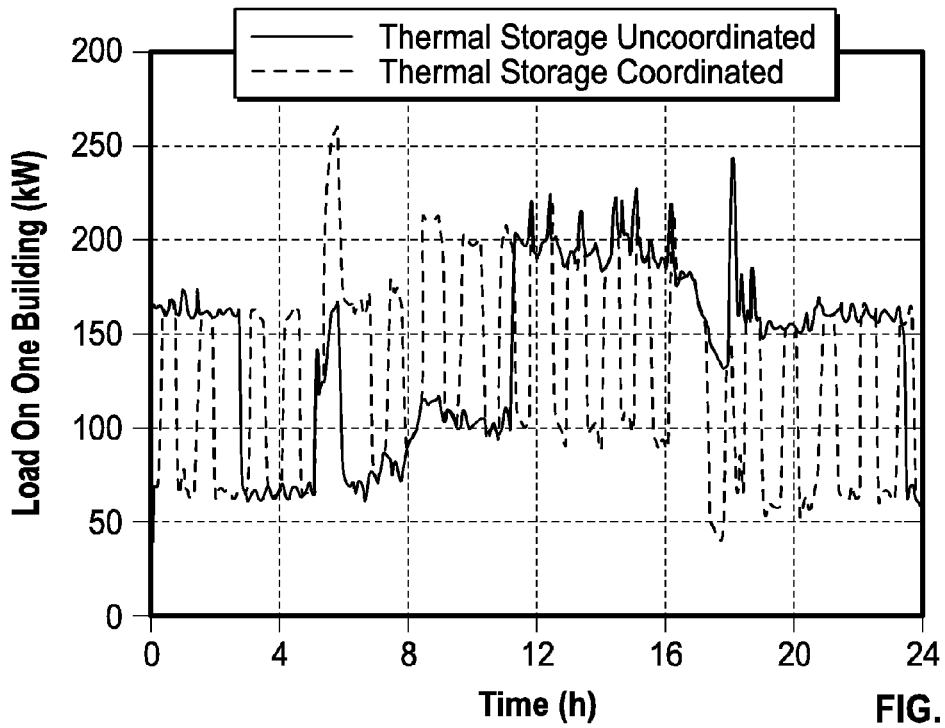
Figure 9B:
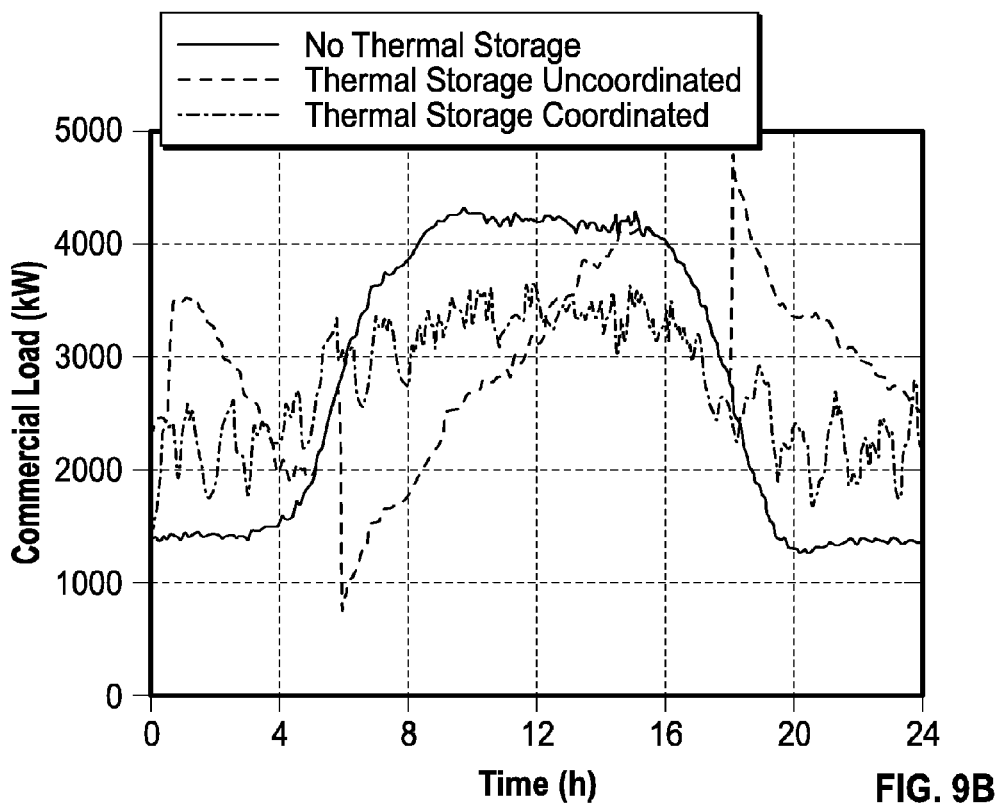

FIGS. 9A and 9B are graphs showing thermal load over a 24 hour period comparing thermal storage that is coordinated and uncoordinated.

Figure 10:
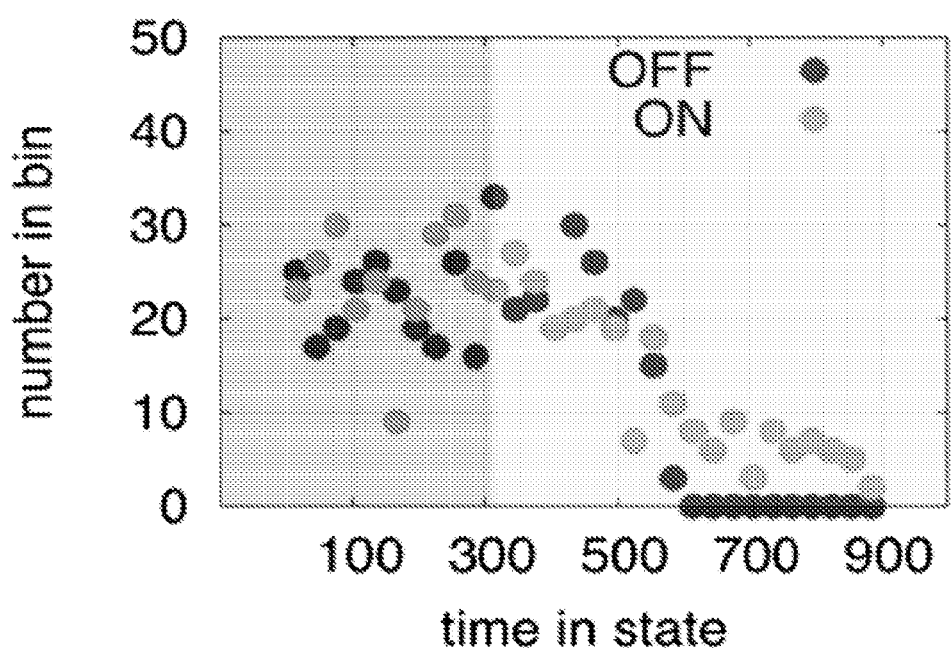

FIG. 10 is a graph showing the distribution of the temperature and the last switching time associated with each TCL.

Figure 11A:
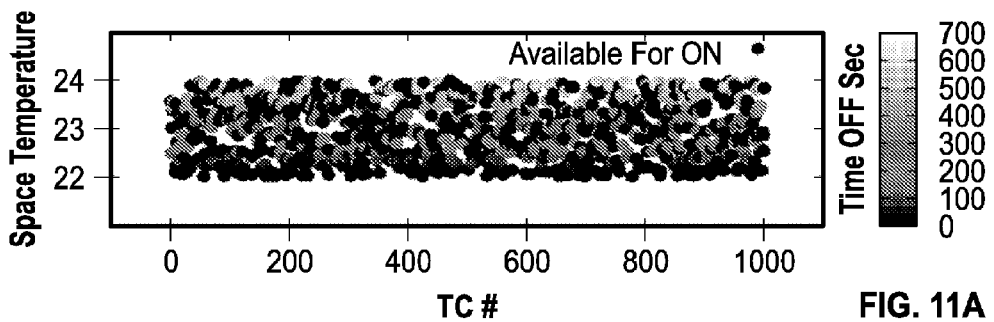
Figure 11B:
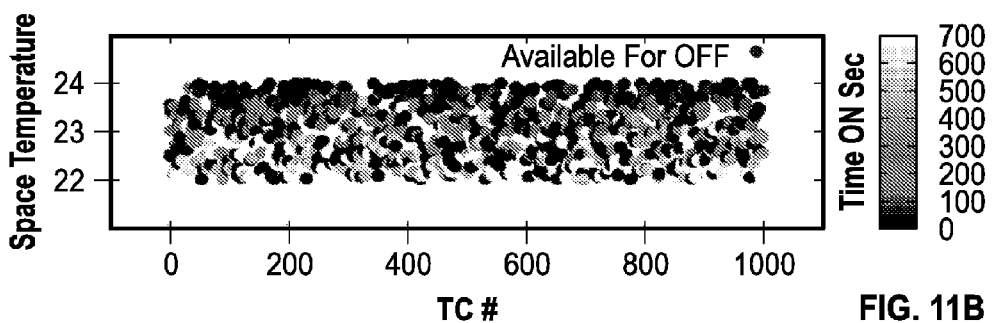

FIGS. 11A and 11B are graphs showing the distribution of thermostat temperatures available for switching 1) ON (FIG. 11A) and 2) OFF (FIG. 11B).

Figure 12A:
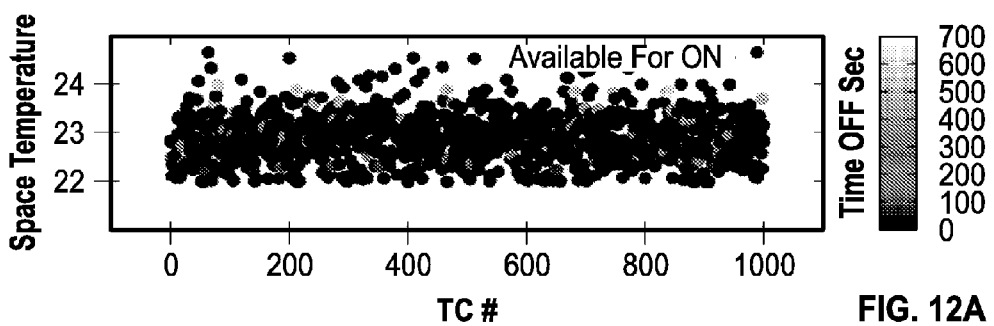
Figure 12B:
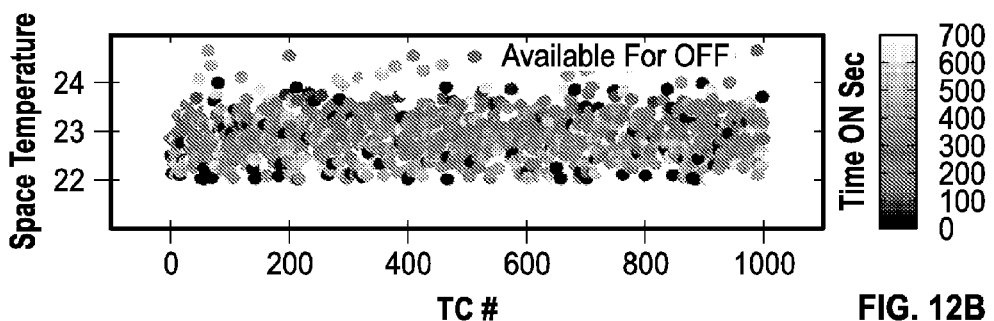

FIGS. 12A and 12B are graphs showing a snapshot of temperature distribution in the middle of a charging cycle, 1) available for ON (FIG. 12A) and 2) available for OFF (FIG. 12B). The energy storage device in these figures has reached its maximum capacity in the middle of the charging cycle.

Figure 13A:
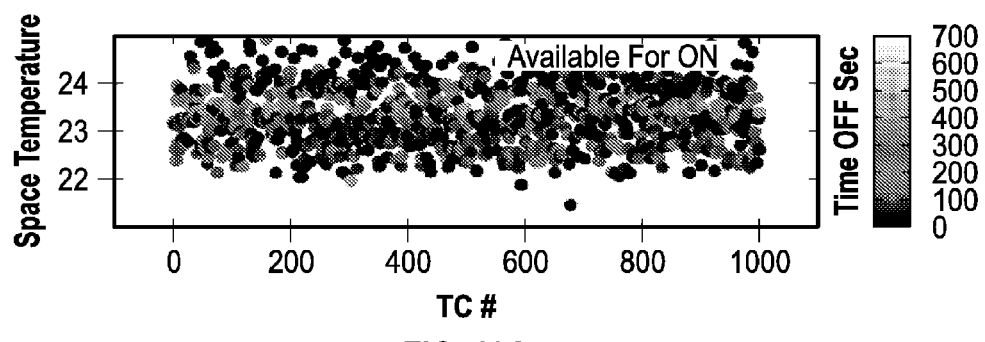
Figure 13B:
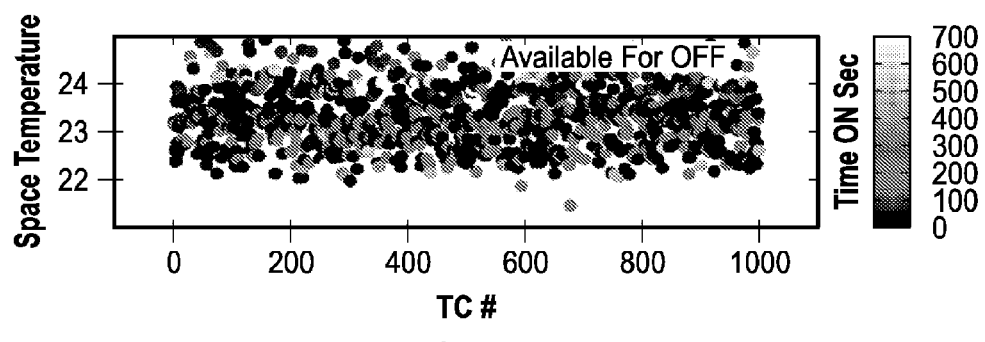

FIGS. 13A and 13B are graph showings a snapshot of the temperature distribution at the end of a charging cycle, 1) available for ON (FIG. 13A) and 2) available for OFF (FIG. 13B). The devices cannot undergo the action as the result of switching dead-time.

Figure 14:
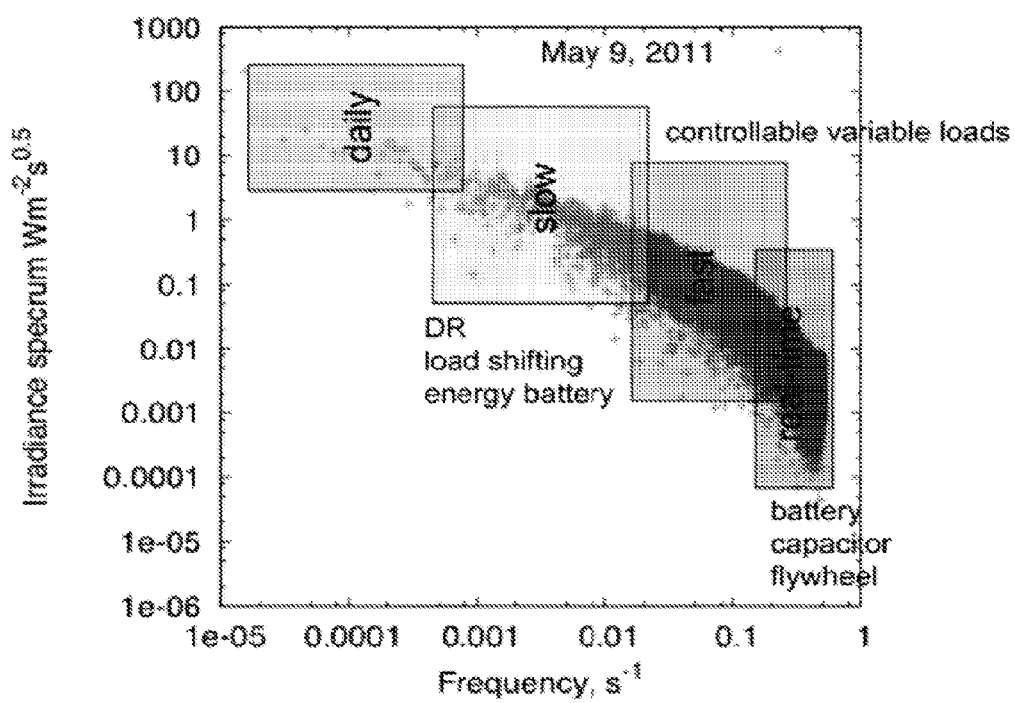

FIG. 14 is a graph showing the capability of resources to address problems in a distribution feeder in a localized control framework in frequency domain.

Figure 15:
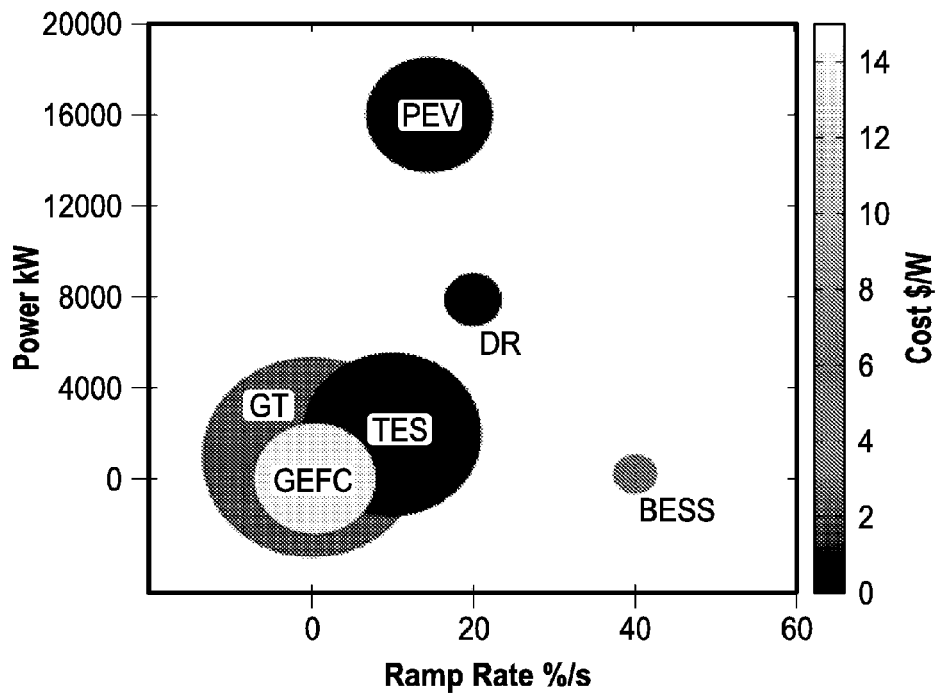

FIG. 15 is another graph showing the capability of resources to address problems in a distribution feeder in a localized control framework.

Figure 16:
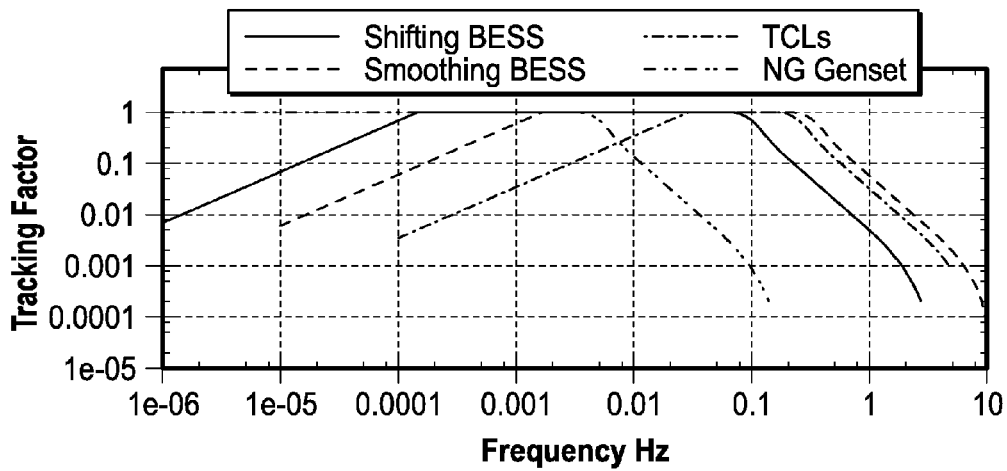

FIG. 16 is a graph showing a frequency response of various storage devices against sinusoidal input signals with various frequencies.

DETAILED DESCRIPTION

Figure 1:
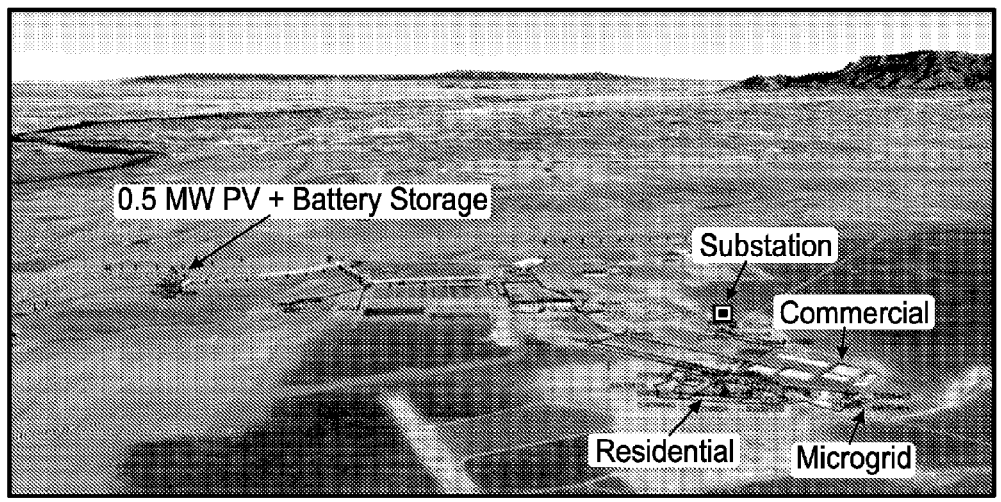
FIG. 1 illustrates an example of a distribution feeder and its components.

Embodiments of the present invention include a system and method for integrating DERs on a power distribution feeder. FIG. 1 is an example of a power distribution feeder and its components. As illustrated in FIG. 1, the example includes PV power generation as well as residential and commercial buildings. There is also an installed micro-grid connected to the feeder. One embodiment of the present invention addresses the cooling load as an asset, not only for a classical demand response which implies load curtailment during the peak load, but also for load management purposes to shape the demand (which may determine that an increase in the load during some periods may be desired and not just to reduce it, in order to avoid the associated demand during the peak). This plays a role for ancillary services in a power grid including frequency regulation.

Another embodiment of the present invention includes a method of using one or more DERs, such as a plurality of TCLs, for future realization to collectively perform a function, such as a specific regulatory function. As a non-limiting example, a function can include but is not limited to adjusting power levels on a power distribution feeder or to contrast intermittent renewable energy generation.

A system and method preferably sends a probability signal from a control center at the power distribution feeder to a plurality of TCLs, which results in a number of remote TCLs to switch their operational status. This probability signal, which is determined by the utility company to cause the TCLs to show a desired aggregated behavior, is a number between 0 (zero) and 1 (one). This number represents the probability that the state of a switching device changes (from ON to OFF and vice versa). The control is done on the ramp rate of the power, rather than the power itself.

In this embodiment, the probability signal is sent to the TCLs over a network, causing an appropriate portion of them to switch their operational status. The network may be, for example, a local area network (LAN) and/or a wide area network (WAN) for connecting to the Internet. The TCLs and control center may connect to the network by any wired and/or wireless means. Moreover, the probability signal used to communicate with the TCLs can be the same for all types of DERs, resulting in minimal infrastructural needs for the communication. The decision making to determine when and if to send a probability signal preferably happens at a power distribution substation. This method includes using TCLs with smart control, e.g. a "NEST" thermostat. The processing power needed for this control scheme is minimal. DERs targeted by this control framework preferably perform an intended role, for example, to keep the occupants comfortable. In one embodiment, a control dead-band is left unaltered and thus a user of a TCL is not aware of the switch in operational status because comfort conditions remain the same.

In another embodiment, feedback from one or more TCLs is used in a control scheme for performing a function. This can occur at the substation level. This communication preferably occurs over the Internet, and does not include Advanced Metering Infrastructure (AMI)—aka Smart Meters. This means that deployment of embodiments of the present invention does not require additional infrastructure such as AMIs.

Examples of DERs include but are not limited to battery energy storage system (BESS), micro-grids, solar energy resources, wind energy resources, photovoltaic energy resources, photovoltaic energy resources with battery storage, fossil fuels, thermal energy storage, thermostatically controlled loads, oil, gas, electricity, hydro energy resources, combinations thereof and the like.

EXAMPLES

The following are non-limiting examples.

This section includes an example that shows the effects of increasing the share of renewable resources in providing electricity for consumers in a power grid. The effects are reflected in terms of voltage and power quality. In addition, the capability of DERs available on a distribution feeder (as demand-side participation for power load balance purposes) is discussed. More specifically, the fluctuations of the generated power from renewable resources can be compensated using DERs.

Figure 2:
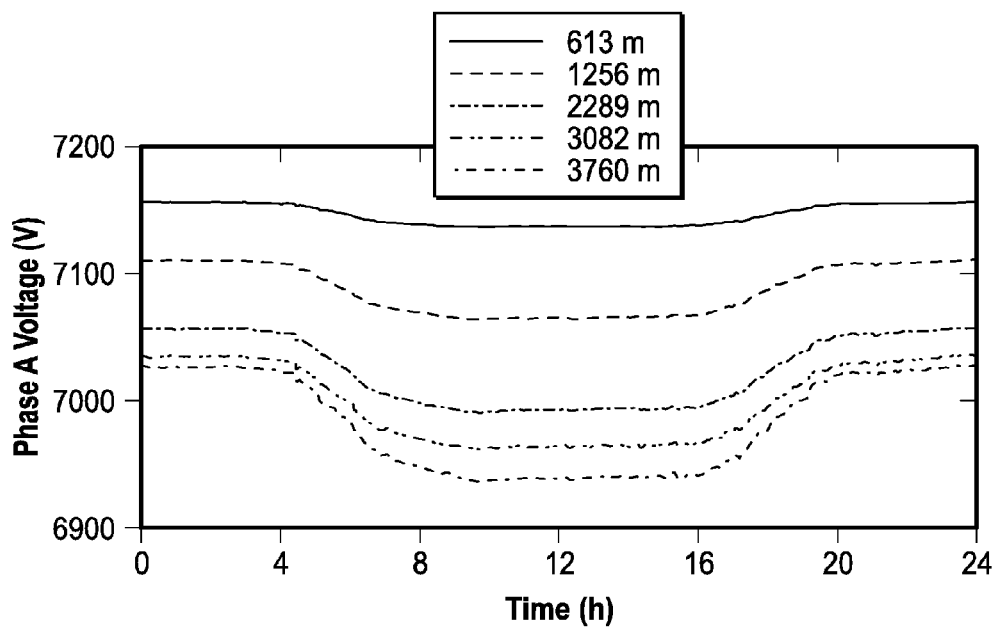
FIG. 2 is a graph showing voltage measured at different distances from the substation on a distribution feeder when power is supplied by a grid using no PV throughout a day.

The results shown in this section are based on simulations in a GridLAB-D model for Studio14 feeder in Albuquerque, N. Mex. The specifications of this model are as follows:
1. RS-12-47-4 12.47 kVA moderate suburban and urban from Taxonomy suite
2. 1000 residential loads
3. 20 commercial loads with active thermal storage
4. 500 kW PV with 1 MWh battery located at far end of feeder
5. 1.3 MW micro-grid with 300 kW output variation located halfway along feeder
6. No LTCs/cap banks
7. Various control/scheduling options The micro-grid itself encompasses the following elements:
1. 240 kW Miller cycle genset
2. 80 kW phosphoric acid fuel cell
3. 50 kW PV array
4. 150 kWh battery storage
5. Heat recovery
6. Hot thermal storage
7. Cold thermal storage
8. micro-EMS to perform schedule optimization and real-time control
9. Hardware-in-the-loop simulation of PNM distribution feeder In FIG. 2, the results of a simulation on the GridLAB-D model of the feeder are shown for an example that the demand is supplied by a substation and not from a PV site. As demonstrated in FIG. 2, being farther from the substation results in an increasing voltage drop throughout the day.

Figure 3:
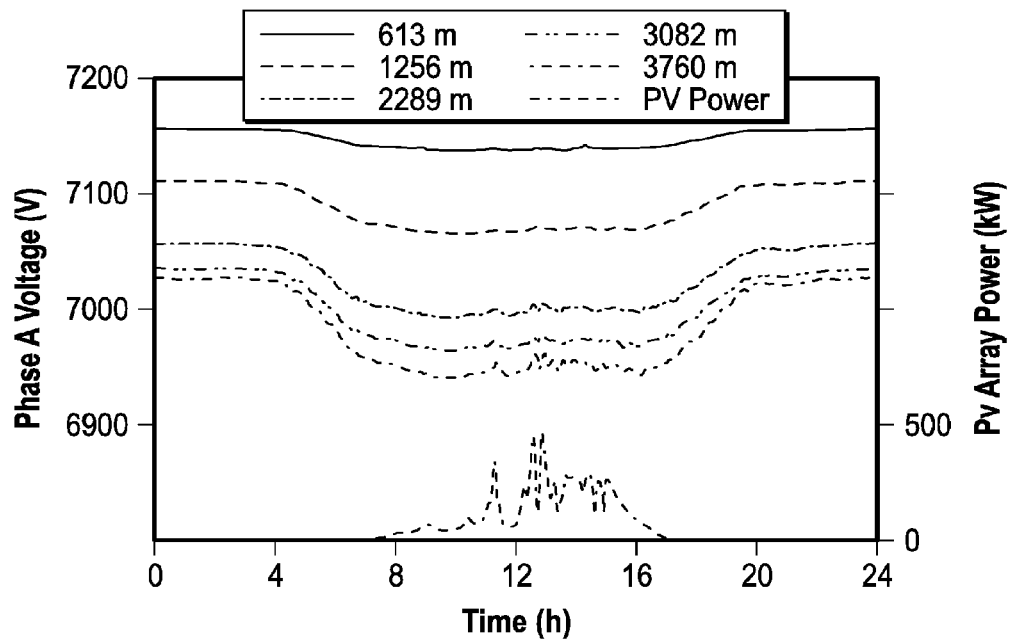
FIG. 3 is a graph showing voltage measured at different distances from the substation on a distribution feeder when power is supplied by both a grid and a PV site throughout a day.
Figure 4:
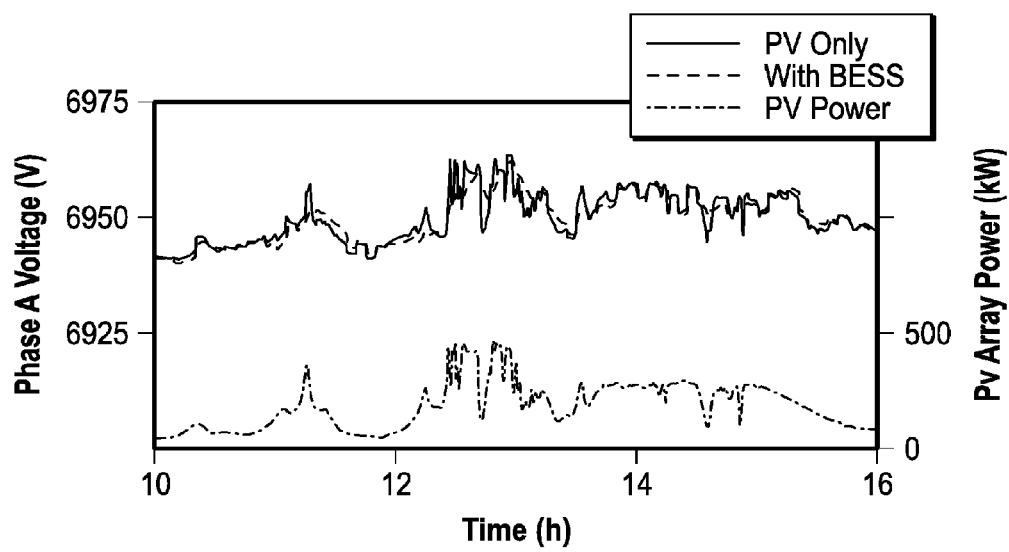
FIG. 4 is a graph showing voltage and power when smoothing batteries are added to a distribution feeder system to compensate for fluctuations associated with PV electricity generation.

Referring to FIG. 3, adding PV electricity generation into the system causes relatively small (0.4%) voltage fluctuations which increases in amplitude with proximity to PV. Small but rapid voltage fluctuations can be cause for concern (e.g. flicker, tripping of re-lays; interference with communication equipment; tripping of electronic equipment, motor operation). The problem may grow as the amount of penetrated PV electric power increases. One or more smoothing batteries may be used to decrease the fluctuations. FIG. 4 shows that using smoothing batteries can compensate for some of the disturbing effects of electricity generation from PV as a renewable resource on the feeder. A BESS can remove rapid fluctuation in voltage, although small voltage fluctuations may remain at lower frequencies. For this purpose, ramp rate of PV is calculated using a moving window of appropriate size. Battery power output is then modified by applying a ramp rate opposite to the PV ramp rate, to the extent of the battery's capacity.

In this example, unintended effects of use of renewable resources were compensated. An element of this example is to have some kind of energy storage that allows for altering the intermittency associated with the renewable resources. The intermittency is not just associated with PV power generation (wind power also comes with fluctuations), and energy storage is not restricted to electrical storage types (other kinds of energy storage including thermal energy storage also apply).

As shown, DERs on a power grid can play a correcting role in a modern power grid. In one example, suitability of a DER on a feeder for power quality regulation in a frequency domain is analyzed.

FIGS. 3-6 show three different scenarios for a shifting BESS to follow a reference sinusoidal input. These figures reflect constraints associated with an energy storage unit that is modeled in a similar fashion to a battery. As one can see, employing a battery for regulatory purposes includes at least ramp rate constraints as well as power and energy capacity ones.

In one example, a tracking problem in an electric power system was assessed along with the resources available on the grid for this specific purpose. In FIG. 6, the criteria used for tracking is demonstrated. As one can see, error is defined in terms of the ratio of the absolute value of the difference between the main signal and the response and the input signal itself during a time window, represented by:

$$e(f) = 1 - \frac{\int_{t_1}^{t_2} |S(t) - R(t)| dt}{\int_{t_1}^{t_2} |S(t)| dt}$$

Based on the above constraints and the introduced metric, it is justifiable to have a band-pass filter for the shifting BESS as shown in FIG. 7. Using this approach, the storage resources may be characterized on a distribution feeder in frequency domain.

TCLs can be considered as thermal storage units in a distribution feeder. More specifically, if a plurality of TCLs operate in aggregation, they can form a DER that can enhance demand-side participation in power balance issue. In FIGS. 8A and 8B, the magnitude of such TCLs when operated collectively in a distribution feeder is demonstrated.

In FIG. 8A, the load profile of a single house and an aggregated number of houses are shown separately. The collective behavior of a plurality of such loads show a significant potential for load management. FIG. 8B represents the same potential for large commercial-size buildings with an emphasis on the share of the cooling loads. Based on these two plots, active thermal energy storage (TES) can shift loads to off-peak periods, and also save energy on-site and at the plant. Buildings with TES units can benefit from optimization services.

FIGS. 9A and 9B show the effect of absence and presence of the thermal loads in the load profile of a distribution feeder. The presence of the thermal load is investigated in two different scenarios; coordinated versus uncoordinated.

It should also be noted that there is a potential to create artificial demand peaks if charging is not coordinated, especially with external optimization. Thus, distribution-level control can alleviate this problem by spreading charging/discharging throughout the off-peak period. Optimization services can incorporate this by altering the characteristics of the storage devices.

Based on the results in FIG. 9A, peak load can be reduced substantially, and moved off-peak. Optimization can still take place as normal, on an individual customer basis. Optimization may include a TES that can work together with PV generation, reducing requirements on BESS. However, due to the fact that there may be relatively few loads, small-scale intermittency may be introduced but then can be removed.

In an embodiment of the present invention, a probability signal is sent to a control center resulting in a number of TCLs, for example, as part of an HVAC system to switch their operation, i.e., turning on while being in off cycle and vice versa. In one example, about one thousand residential buildings were used and focus was on the HVAC units installed on them and the TCLs. Moreover, the set-points of the TCLs were uniformly distributed over about 22.5-23.5° C. with an about 3° C. dead-band. The switching dead-time of these TCLs is five (5) minutes (to avoid damaging a thermostatic device by frequent and successive switching).

For this example, a control strategy was designed and utilized. The control structure used in this example preferably had three features: 1) stochastic-based command following; 2) ramp-rate scheme for control; and 3) switching as the control action rather than changing the set-points. In many cases, the real-time control actions by a pricing framework on a grid are prevented by local regulations. Instead, there may be an agreement between the utility company and the end-users (directly or through a third party, e.g., a load aggregator) for a stochastic control scheme. In this scheme, the utility (or possibly a third party) sends a signal which represents the probability of taking a certain action. Then, a smart control unit (installed in each building) generates a random number from a uniform distribution density function. If this generated number is less than the one provided by the utility, an action is taken (e.g., the already OFF thermostat switches ON). The action may be postponed until the next step, otherwise. With this framework, an associated value of the utility company signal may be 0.2, and then about 20% of the overall addressed devices on average may take the action at the end of the step according to the sufficiency of the agents set cardinality (which was 1000 in this example).

A system response in frequency-domain was modeled. A limit addressed in this example was due to the dead-time associated with switching. As mentioned in the previous sections, there is a dead-time between successive switching actions mainly as a result of mechanical considerations. In this example, the dead-time was five (5) minutes. FIG. 10 shows the state of the agents at an arbitrary snapshot. Based on FIG. 10, a considerable portion of the thermostatic devices could not undergo the switching action.

A distribution of the temperatures in two categories for the unperturbed system is shown in FIGS. 11A and 11B. FIG. 11A shows a case where thermostats are OFF. The available thermostatic devices for switching are those that have been in the current state longer than the dead-time, depicted by the lighter circles, while those that are shown with darker circles are thermostatic devices that have not passed their dead-time. As expected, the lower half is more occupied with the thermostatic devices that have lower temperatures which are more likely to have been undertaken by an automatic switching when reaching their lower temperature band, while the upper half is more occupied with those that are near the upper temperature band, as being OFF for a considerable time after automatic switching from the ON-state at their lower temperature band, and are ready to switch ON again.

FIG. 11B shows the distribution of the thermostatic devices' temperatures available for switching OFF, depicted by the lighter circles, while those that are shown with the darker circles are devices that have not passed their dead-time.

The aforementioned characteristics of thermostatic thermal storage devices (e.g., HVAC devices) are affected with the switching dead-time feature of the individual agents. Furthermore, there is a difference between a battery and one or more TCLs, which is the absence of an IDLE mode. More specifically, when a battery reaches its maximum energy content, it maintains its stored energy as long as it depletes the energy in a discharge process. In thermostatic loads, however, the IDLE mode does not exist, as it is under permanent temperature change according to the surrounding environment.

Thermostatic loads have a maximum storable amount of energy. In FIGS. 12A and 12B, a snapshot of temperature distribution of an affected system by a lower frequency signal is shown in the middle of a charging cycle. Similar to the case of a battery, the system reaches its maximum energy capacity in the middle of the charging cycle. FIGS. 12A and 12B show that most of the thermostats are ON and ready to turn OFF for discharge in the middle of a charging cycle. In other words, the duration of charging cycle has been so long that the energy content of the signal exceeded the maximum capacity of the storage device.

Having the energy storage framework in mind, the charge and discharge processes do not happen immediately. This is reflected in the ramp-rate limitation. In other words, there are bounds for charging and discharging rates of any energy storage device. FIGS. 13A and 13B show a temperature distribution at the end of a charging cycle. As illustrated in FIGS. 13A and 13B, there are still considerable number of thermostatic devices that have not passed their dead-time and are thus not ready to undergo any action. FIGS. 13A and 13B show that thermostatic devices cannot undergo an action because of switching dead-time. This feature may affect this characteristic more severely than the energy capacity of storage devices.

To address the effect of switching dead-time, the collective behavior of a system was analyzed against a single frequency sinusoidal signal. Then, the collective behavior was evaluated for a range of different frequencies. The system was modeled as a battery similar to the one shown in FIG. 5.

Based on the examples, for a TES of interest:
1. At medium frequencies, there was substantial usable energy storage but it was not controlled well.
2. At high frequencies, there was plenty of energy but a limited capability for repeated switches equivalent to rapidly degrading ramp rate capacity.
3. There appeared to be a resonant frequency that depended on physical/mechanical characteristics of houses and HVACs.
4. The capacity of systems to maintain unaltered comfort was not compromised by the switching control.

FIG. 16 shows the decomposition of the Power Spectral Density (PSD) of the demand in the frequency domain. By this partitioning, the appropriate resource can be assigned (which have been characterized in advance by the method introduced in the previous section) to the problem of interest. This approach involved the following to manage the DERs:
1. To pick resources to meet a goal at minimum cost.
2. To pick resources to provide a certain level of redundancy.
3. To pick resources to locate high frequency storage, load and/or generation in close proximity.
4. To pick resources so that they are controllable with minimal additional infrastructure.

5. Identify economic/market mechanisms that promote deployment and integration of resources.

The capability of the resources to address the problems in a distribution feeder in a (partially) localized control framework is shown in FIGS. 14 and 15.
1. DERs can play a significant role in dealing with the intermittencies associated with typical renewable resources generated power at the feeder level.
2. High-frequency voltage fluctuations are best dealt with near the voltage source.
3. Other forms of storage, especially large TES, can flatten load, but voltage fluctuation can emerge.
4. Intelligence in all devices, large and small, can become part of the solution.
5. Design of control strategies can account for coupling of interactions between DERs.

The examples above assessed the level of reliance on the thermostatic loads (more specifically cooling loads as the largest contributor to the power demand during the hot summer day peaks) for load management affairs not only in a classic approach (of demand response) for load curtailment, but also for the charging purposes in a load shaping scheme. Various frequencies were applied by sinusoidal signals into the system in a stochastic approach as a replacement for prevented real-time pricing solutions.

Based on collective behavior of individual single TCLs, the level of participation of thermostatic loads in a load management system for load shaping purposes was determined. The results showed that the switching dead-time plays a role in both the time-scale of the energy market and the maximum power participating in the load shaping programs.

In addition to the thermostatic devices that have switching dead-bands there are some types of thermostatic devices that do not have switching dead-bands. Those devices can compensate the load-generation imbalances in finer time resolutions (in order of second). Thus, a load management program can use both thermostatic devices with switching dead-bands and without switching dead-bands to optimize (or minimize) the cost of deviation from the foreseen load and/or generation profiles on a distribution feeder.

The embodiments of this invention include a system and method for integrating DERs on a power distribution feeder to address some of ever increasing problems associated with increasing the share of renewable resources in power generation portfolio in a modern system. More specifically, the resources and problems are investigated in frequency-domain, revealing the limits of each resource and its capability to address a problem. The problem may need to be divided into several sub-problems and an appropriate DER (e.g., some kind of energy storage) is chosen to solve a particular sub-problem. For example, smart thermostats (e.g., Nest) can be programmed to act in a coordinated fashion to control the power of a distribution feeder. There are currently large intermittencies on a power distribution feeder and as more renewable resources play a role in power generation, the load of the power distribution feeder may need to be controlled and adjusted at the distribution level. In this case, the power distribution feeder acts as a microgrid.

In one embodiment, a probability signal is sent to a user's thermostat, and it may switch from OFF to ON or ON to OFF. The individual thermostats can then be combined to create an aggregated load which smooth's the intermittencies and gives the power distribution feeder a certain amount of control. Aggregated TCLs such as smart thermostats can control at a fast rate in fast frequencies. A power distribution feeder can obtain information via the Internet from a plurality of thermostats. A control loop can then be created to send instructions to one or more thermostats about once per second at a low band width. The thermostats then send information to a substation regarding temperature and time of switch to ON or OFF state. This enables for faster collection of data and a higher rate of control. Whether a thermostat changes state from ON or OFF depends on where the thermostat temperature is in a temperature band, it is not chosen based on an algorithm.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A control device at a power distribution feeder, comprising:
a control device at a power distribution feeder, wherein the control device is coupled via a communication network to a plurality of thermostatically controlled loads that draw electrical power from said power distribution feeder;
wherein the control device is configured to send a probability signal to the plurality of thermostatically controlled loads via the communication network;
wherein the probability signal includes a status switch probability to be applied independently by multiple of the plurality of thermostatically controlled loads so that each of the multiple thermostatically controlled loads has a probability of switching status which is controlled by the probability signal, and so that the aggregated multiple thermostatically controlled loads thereby present an aggregate load at the power distribution feeder which is controlled by the probability signal.

2. The control device of claim 1 wherein the plurality of thermostatically controlled loads include thermal storage units.

3. The control device of claim 1 wherein the plurality of thermostatically controlled loads include smart thermostats, and wherein switching status by a smart thermostat comprises activating or deactivating a heating or cooling system.

4. The control device of claim 1 wherein the power distribution feeder is coupled with an energy storage system to store a portion of the aggregate load at the power distribution feeder.

5. The control device of claim 1 wherein the control device adjusts the probability signal to accommodate intermittent renewable energy generation.

6. The control device of claim 1 wherein the control device operates without input from an advanced meter infrastructure.

7. The control device of claim 1 wherein the probability signal is sent to the plurality of thermostatically controlled loads about once per second.

8. The control device of claim 1 wherein thermostatically controlled loads among said plurality of thermostatically controlled loads apply the status switch probability of the probability signal when a predetermined condition is met, and wherein the predetermined condition is a temperature at a thermostatically controlled load which is measured to be within a predetermined temperature range.

9. A method of controlling an aggregated load at a power distribution feeder, comprising:
- sending, by a control device at the power distribution feeder, a probability signal to a plurality of thermostatically controlled loads over a communication network, the probability signal including a status switch probability to be applied independently by multiple of the plurality of thermostatically controlled loads;
- independently applying, by each of the multiple thermostatically controlled loads, the probability signal so that each of the multiple thermostatically controlled loads has a probability of switching status which is controlled by the probability signal, and so that the aggregated multiple thermostatically controlled loads thereby present an aggregate load at the power distribution feeder which is controlled by the probability signal.

10. The method of claim 9, further comprising adjusting the probability signal in order to reduce peak load at the power distribution feeder.

11. The method of claim 9, further comprising adjusting the probability signal in order to shift power distribution feeder loads to off-peak periods.

12. The method of claim 9, further comprising adjusting the probability signal in order to control a ramp rate of power at the power distribution feeder.

13. The method of claim 9, further comprising adjusting the probability signal in response to intermittent renewable energy generation.

14. The method of claim 9 wherein the plurality of thermostatically controlled loads include thermal storage units.

15. The method of claim 9 wherein the plurality of thermostatically controlled loads include smart thermostats.

16. The method of claim 9 further comprising storing at least a portion of the aggregated load in an energy storage system.

17. The method of claim 9 wherein thermostatically controlled loads among said plurality of thermostatically controlled loads apply the status switch probability of the probability signal when a predetermined condition is met, and wherein the predetermined condition is a temperature at a thermostatically controlled load which is measured to be within a predetermined temperature range.

* * * * *